US006836318B2

(12) United States Patent
Beller

(10) Patent No.: US 6,836,318 B2
(45) Date of Patent: Dec. 28, 2004

(54) REFLECTOMETER WITH IMPROVED RECEIVER SENSITIVITY

(75) Inventor: Josef Beller, Tuebingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 142 days.

(21) Appl. No.: 10/095,731

(22) Filed: Mar. 12, 2002

(65) Prior Publication Data
US 2003/0048434 A1 Mar. 13, 2003

(30) Foreign Application Priority Data

Sep. 8, 2001 (EP) .......................................... 01121516

(51) Int. Cl.⁷ .............................................. G01N 21/00
(52) U.S. Cl. ................................................... 356/73.1
(58) Field of Search .................... 356/73.1; 250/227.16, 250/227.18; 398/9–38

(56) References Cited

U.S. PATENT DOCUMENTS 5,589,933 A  12/1996  Osgood et al. ............ 356/73.1
5,963,313 A  10/1999  Anderson .................. 356/73.1

OTHER PUBLICATIONS

Ribbe, A., Examiner. European Search Report, Application No. EP 01 12 1516, dated Feb. 7, 2002.

Primary Examiner—Tu T. Nguyen

(57) ABSTRACT

In a reflectometer measurement for measuring—in response to a stimulus signal—return signals reflected and/or backscattered in a network to be measured, operation for receiving the return signals is temporarily disabled or at least suppressed during such operation modes, wherein return signals resulting from closer ranges of the network can cause substantial spurious signals to be added to return signals resulting from more distant ranges of the network.

14 Claims, 2 Drawing Sheets

REFLECTOMETER WITH IMPROVED RECEIVER SENSITIVITY

BACKGROUND OF THE INVENTION

The present invention relates to reflectometer measurements.

Optical reflectometer measurements are applied for testing fiber optic cables in today's fiber optic network, and described in detail e.g. by the inventor in chapter 11 of the book 'Fiber Optic Test and Measurement' by Derickson Dennis, 1998, ISBN 0-13-534330, in U.S. Pat. Nos. 5,589,933, or in 5,963,313.

SUMMARY OF THE INVENTION

It is an object of the invention to provide an improved reflectometer measurement. This is solved by the independent claims. Preferred embodiments are shown by the dependent claims.

According to the present invention, a reflectometer is provided for measuring—in response to a stimulus signal—return signals, reflected and/or backscattered in a network to be measured. A receiver of the reflectometer is adapted to receive the return signals at different receiver sensitivities.

In operation, at least two different reflectometer measurements can be conducted either after each other or alternatively: a distant range measurement with higher receiver sensitivity for measuring return signals from a more distant range of the network, and a close range measurement with lower receiver sensitivity for measuring return signals from a closer range of the network.

During the distant range measurement, the operation of the receiver will be temporarily disabled (or at least be suppressed) during such operation modes of the receiver, wherein return signals resulting from closer ranges of the network would cause the receiver to generate substantial spurious signals, which lead to interference when the receiver will receive return signals resulting from more distant ranges of the network. Without such disabling or suppression, the generated substantial spurious signals would superimpose with the received return signals resulting from the more distant ranges of the network.

The term 'spurious signals' as used herein shall mean unwanted signals not resulting from stochastic noise but may be caused e.g. by dynamic recovery processes as result to e.g. thermal increase in the receiver resulting from the closer range return signals. Such closer range return signals generally have significantly higher power than the return signals from the more distant range of the network. However, such high power return signals received with the higher receiver sensitivity (in the distant range measurement) can lead to a significant temperature rise of the receiver which can cause spurious signals in the receiver resulting from dynamic recovery processes once the heating up stops or is decreased.

It is to be understood that while stochastic noise can generally be extracted to a certain extend from the measured results, spurious signals can hardly be detected as such and will therefore be regarded as (valid) signals thus adulterating the measurement. In particular spurious signals resulting from dynamic recovery process generally exhibit exponential characteristic 'matching well' with expected reflectometer measuring results, and become therefore not transparent as measuring faults.

Due to the reflected and/or backscattered nature of the return signals, the return signals from the closer range will appear earlier at the receiver than the return signals from the more distant range of the network. That means that the higher power closer range return signals will first heat up the receiver, or components of the receiver, which will then later cause spurious signals when the lower power distant range return signals appear. Due to the significant power differences between return signals from closer and distant ranges, the thus 'induced' spurious signals can significantly disturb the distant range measurement. The invention, however, avoids or at least reduces the generation of such spurious signals by disabling (or at least suppressing) the operation of the receiver during such times of the distant range measurement, when the closer range return signals with higher power appear, which would cause such recovery processes and thus the spurious signals.

Since the return signals from the closer range will appear earlier at the receiver than the return signals from the more distant range of the network, the invention can make use of that effect by disabling (or at least suppressing) such higher power closer range return signals preferably until the lower power distant range return signals appear.

The differentiation between such higher power closer range return signals (to be disabled or suppressed) and the lower power distant range return signals can be accomplished by e.g. establishing trigger or threshold values (e.g. for the power) of the return signals, by defining an appropriate time interval, or by experience resulting e.g. from previous measurements.

In a preferred embodiment, the disabling (or at least suppressing) of the operation of the receiver is accomplished by masking the return signal, e.g. by providing a switch, attenuation or shutter element in the signal path of the return signal of the receiver, so that the return signal will only reach partly, attenuated or not at all the receiver.

In another embodiment, the receiver can be switched off for disabling (or at least suppressing) the operation thereof. Preferably in case the receiver comprises a photo diode (e.g. an avalanche photo diode APD), this photo diode will be switched off by modifying its bias voltage (as well known in the art).

In case the disabling (or at least suppressing) of the operation of the receiver leads to transient behaviors thereof, such transient behaviors have to be taken into account when interpreting the measuring results. This can be done e.g. by allowing for a time interval for the transition from low sensitivity to high sensitivity state that is afterwards discarded in the measurement result.

A complete measurement result can be obtained by combining the results of the at least two reflectometer measurements as disclosed e.g. in the aforementioned book 'Fiber Optic Test and Measurement'.

In a preferred embodiment employing an optical time domain reflectometer (OTDR), the measurement hardware is set to a constant gain during each trace acquisition. The gain is then changed during the trace acquisition. This way the receiver is set to an insensitive state first, when high power signals are likely to occur, and then set to high sensitivity when small signals only reach the receiver because of the attenuation of the optical fiber. The advantage is that, with proper implementation, high power levels won't generate a high temporal power dissipation in the photo diode, which otherwise would lead to an undesirable thermal recovery process.

A standard approach for increasing the performance, e.g. the measurement range of OTDRs, is the use of laser diodes with very high output power. This is a rather straightforward way, since the fiber response signal is proportional to the probing pulse power. However, this method collides with the requirement of having a very sensitive receiving circuit because a sensitive receiver shows normally a high susceptibility to high power level signals. However, the invention provides an improved opto-electronic receiving circuit preventing the receiver from being saturated and thermally imbalanced thus leading to a highly sensitive OTDR receiver that is tolerant against high power optical signals.

The invention can be partly or entirely embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawing. Features that are substantially or functionally equal or similar will be referred to with the same reference sign(s).

DETAILED DESCRIPTION OF THE INVENTION

Figure 1:
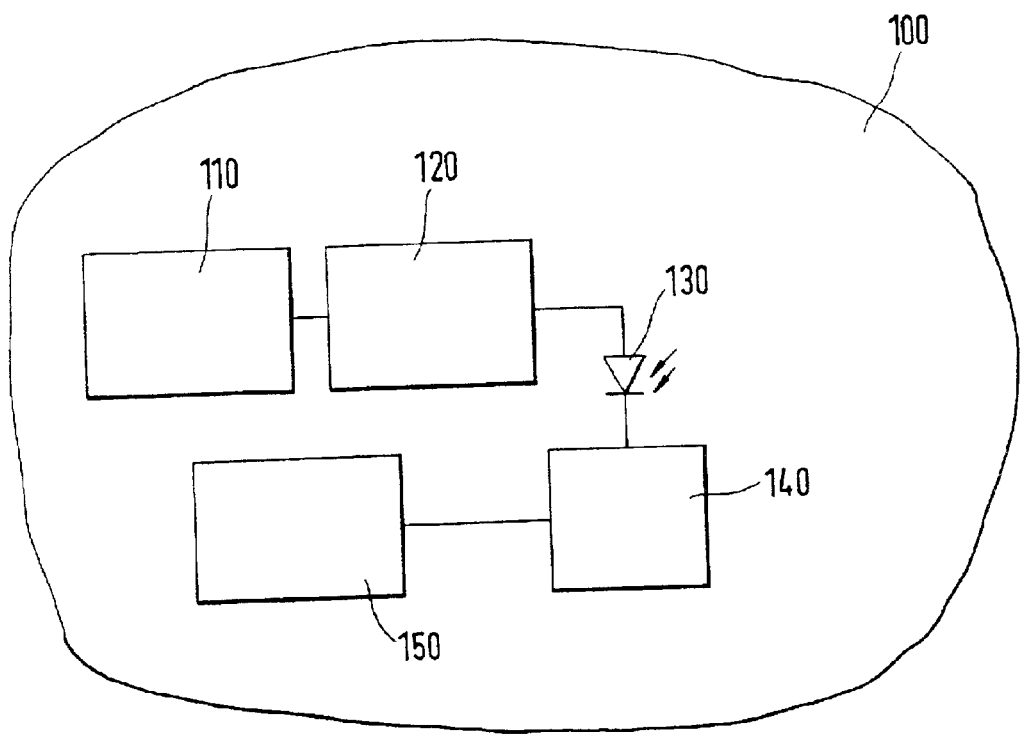
FIG. 1 shows a preferred embodiment of an OTDR receiver according to the present invention.

FIG. 1 shows a preferred embodiment of an OTDR receiver 100 according to the present invention, comprising a data acquisition and processing unit 110, a receiver 120, an APD 130, a bias voltage switch 140, and a bias voltage generator 150.

Reflectometer measurements in general are well known in the art (as disclosed e.g. in the aforementioned book 'Fiber Optic Test and Measurement') and need not be explained in detail herein. An optical laser pulse is launched into a fiber under test and the backscattered and reflected light signal is measured and processed. With very long fiber links the return signal finally becomes too small to be detected. This can be compensated by increasing the power level of the probing signal. However, this approach is limited by the receiver's ability to withstand strong optical signals. In OTDR measurements the instruments receiver generally has to cope with a very wide power range. High power levels can lead to a thermal imbalance in the receiver front end with a long recovering time, rendering the instrument unable to acquire (tiny) signals accurately.

Figure 2:
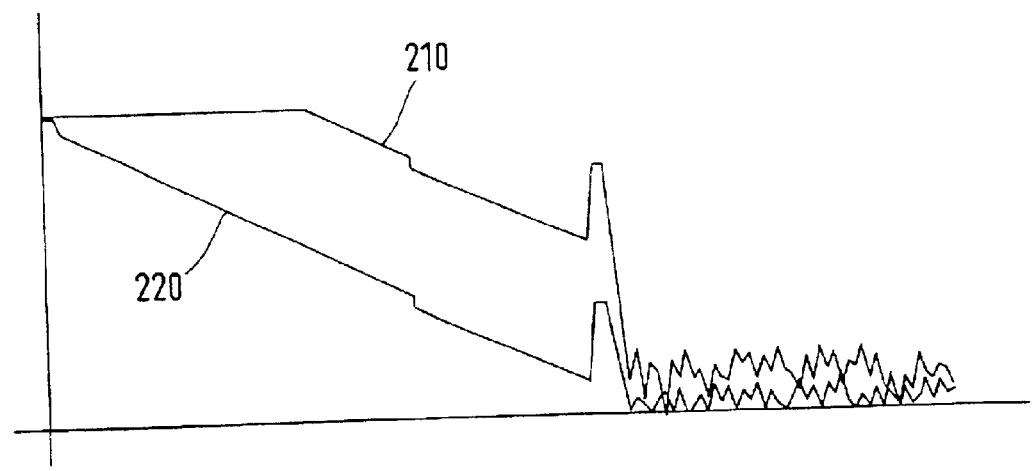
FIG. 2 shows two traces taken with different, but fixed, receiver gains.

FIG. 2 shows two traces 210 and 220 taken with different, but fixed, receiver gains. As apparent from FIG. 2, there are strong signals shortly after firing a probing pulse, while the signal intensity fades with distance. Strong signals generally generate photocurrents, which cause the small diode chip of the APD 130 to raise its temperature, due to the high bias voltage. This, again, leads to an increased dark current during a settling process. The time constant is normally long compared to the velocity of optical signals, so that the effect is lasting for a complete measurement shot.

High pulse power and high gain for the APD 130 is needed for long distance ranges only. With short fibers, reduced power or reduced gain is possible, thus avoiding the described adverse effect. Long range measurements can be achieved by combining measurement shots taken with different pulse power and different gains.

Figure 3:
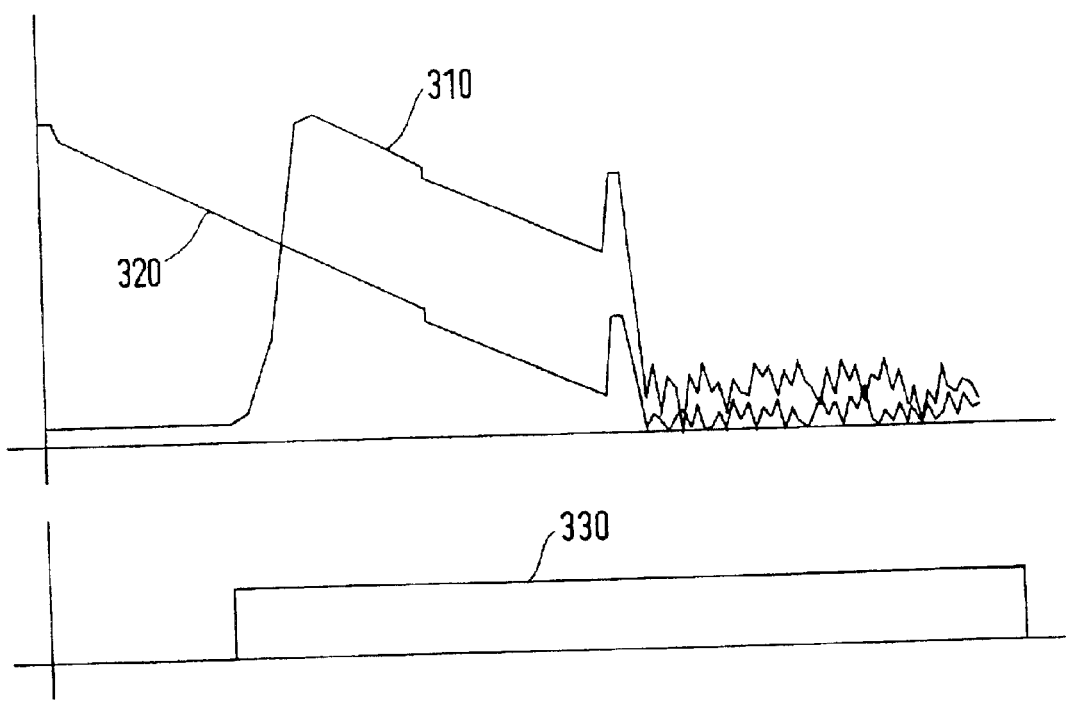
FIG. 3 shows two traces taken according to the present invention.

FIG. 3 shows two traces, the first 310 with a lower fixed gain, the second 320 with a variable receiver gain. Also, an example of a control signal 330 for the bias supply of the APD 130 is depicted.

The most sensitive setting is taken for the signals that stem from fiber sections far away. Signals coming from short fibers are too strong and saturate the receiver. The time the receiver is saturated doesn't add any usable information. During this time, the APD 130 can be turned off completely (as indicated by the control signal 330), thus avoiding heating of this APD 130.

What is claimed is:

1. A method for providing a reflectometer measurement for measuring, in response to a stimulus signal, return signals in a network to be measured, said method comprising:

conducting a close range measurement with a lower receiver sensitivity for measuring return signals from a close range of said network, conducting a distant range measurement with a higher receiver sensitivity for measuring return signals from a distant range of said network, wherein said conducting said distant range measurement includes:

temporarily disabling a receiving operation so as to avoid receiving return signals from said close range that can cause substantial spurious signals which could superimpose with return signals from said distant range, wherein said spurious signals represent unwanted signals not resulting from stochastic noise; and enabling said receiving operation to receive return signals from said distant range; and combining results from said close range measurement and results from said distant range measurement to yield a combined result.

2. The method of claim 1, wherein said temporarily disabling is executed until an occurrence of a condition selected from the group consisting of (a) a power level of said return signals crosses a threshold, and (b) an expiration of a predetermined time interval.

3. The method of claim 1, wherein said combining results comprises taking into account transient behaviors caused by said temporarily disabling, for interpreting said results from said distant range measurement.

4. The method of claim 3, wherein said combining result comprises discarding a time interval for transition from said lower receiver sensitivity to said higher receiver sensitivity.

5. The method of claim 1, wherein said temporarily disabling is executed when said return signals exceed defined trigger or threshold values, or during a predefined time interval.

6. A method for providing a reflectometer measurement for measuring, in response to a stimulus signal, return signals in a network to be measured, said method comprising:

conducting a close range measurement with a lower receiver sensitivity for measuring return signals from a close range of said network, conducting a distant range measurement with a higher receiver sensitivity for measuring return signals from a distant range of said network, wherein said conducting said distant range measurement includes:

temporarily disabling a receiving operation so as to avoid receiving return signals from said close range that would cause generation of substantial spurious signals when return signals resulting from said distant range would be received, so that without such disabling, said generated substantial spurious signals would superimpose with received return signals from said distant range; and enabling said receiving operation to receive return signals from said distant range; and combining results from said close range measurement and results from said distant range measurement to yield a combined result.

7. The method of claim 6, wherein said temporarily disabling is executed until an occurrence of a condition selected from the group consisting of (a) a power level of said return signals crosses a threshold, and (b) an expiration of a predetermined time interval.

8. The method of claim 6, wherein said combining comprises taking into account transient behaviors caused by said temporarily disabling, for interpreting said results from said distant range measurement.

9. The method of claim 8, wherein said combining results comprises discarding a time interval for transition from said lower receiver sensitivity to said higher receiver sensitivity.

10. The method of claim 6, wherein said temporarily disabling is executed when said return signals exceed defined trigger or threshold values, or during a predefined time interval.

11. A software program or product, stored on a data carrier, for executing a method for providing a reflectometer measurement for measuring, in response to a stimulus signal, return signals in a network to be measured, when run on a data processing system such as a computer, said method comprising:

conducting a close range measurement with a lower receiver sensitivity for measuring return signals from a close range of said network, conducting a distant range measurement with a higher receiver sensitivity for measuring return signals from a distant range of said network, wherein said conducting said distant range measurement includes:

temporarily disabling a receiving operation so as to avoid return signals from said close range that can cause substantial spurious signals which could superimpose with return signals from said ditant range, wherein said spurious signals represent unwanted signals not resulting from stochastic noise; and enabling said receiving operation to receive return signals from said distant range; and combining results from said close range measurement and results from said distant range measurement to yield a combined result.

12. A reflectometer for measuring, in response to a stimulus signal, return signals in a network to be measured, comprising:

a receiving unit to receive return signals at different receiver sensitivities, and a control unit for:

conducting a close range measurement with a lower receiver sensitivity of said receiving unit for measuring return signals from a close range of said network, conducting a distant range measurement with a higher receiver sensitivity of said receiving unit for measuring return signals from a distant range of said network, wherein said conducting said distant range measurement includes:

temporarily disabling said receiver so as to avoid receiving return signals from said closer range that can cause substantial spurious signals to be added to return signals from said distant range; and enabling said receiving unit to receive return signals from said distant range; and combining results from said close range measurement and results from said distant range measurement to yield a combined result.

13. The reflectometer of claim 12, wherein said receiving unit comprises an Avalanche Photo Diode, and said control unit comprises a bias voltage generator and a bias voltage switch.

14. A method comprising:

launching an optical signal into a network;

disabling a receiving operation to avoid receiving a return of said optical signal from a close range in said network;

enabling said receiving operation to receive a return of said optical signal from a distant range in said network; and employing said return of said optical signal from said distant range for a reflectometry measurement.

* * * * *